(12) United States Patent
Klein et al.

(10) Patent No.: US 11,995,012 B2
(45) Date of Patent: May 28, 2024

(54) HIGH SPEED INTERFACE FOR MULTI IMAGE SENSOR DEVICE

(71) Applicant: SAMSUNG ELECTRONICS CO., LTD., Suwon-si (KR)

(72) Inventors: Avi Klein, Tel-Aviv (IL); Dror Barash, Tel-Aviv (IL); Guy Horowitz, Tel Aviv (IL); Oren Reinherz, Tel-Aviv (IL); Roi Herman, Tel-Aviv (IL); Amit Eisenberg, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 17/695,204

(22) Filed: Mar. 15, 2022

(65) Prior Publication Data

US 2023/0297525 A1 Sep. 21, 2023

(51) Int. Cl.
  *G06F 13/24* (2006.01)
  *G02B 27/01* (2006.01)
  *G06F 13/364* (2006.01)
  *G06F 13/42* (2006.01)
  *H04N 13/243* (2018.01)
  *H04N 13/296* (2018.01)

(52) U.S. Cl.
  CPC .......... *G06F 13/24* (2013.01); *G02B 27/017* (2013.01); *G06F 13/364* (2013.01); *G06F 13/4256* (2013.01); *G06F 13/4291* (2013.01); *H04N 13/243* (2018.05); *H04N 13/296* (2018.05); *G02B 2027/0178* (2013.01)

(58) Field of Classification Search
CPC .... G06F 13/24; G06F 13/364; G06F 13/4291; G06F 13/4256; G02B 27/017; G02B 2027/0178; H04N 13/243; H04N 13/296
See application file for complete search history.

(56) References Cited

U.S. PATENT DOCUMENTS

| 9,390,032 B1 | 7/2016 | Baldwin |
| 10,353,837 B2 | 7/2019 | Sengoku et al. |
| 10,769,084 B2 | 9/2020 | Foust et al. |

(Continued)

FOREIGN PATENT DOCUMENTS

| EP | 3055779 | 8/2016 | |
| KR | 20190030946 A | * 3/2019 | .......... H04N 23/665 |
| WO | 2015195329 | 12/2015 | |

OTHER PUBLICATIONS

Machine translation of KR20190030946A (Year: 2019).*

*Primary Examiner* — Glenn A. Auve
(74) *Attorney, Agent, or Firm* — F. Chau & Associates, LLC

(57) ABSTRACT

A multi-image sensor system includes data, clock, and control buses, an application processor connected to the data bus and the clock bus, and image sensors connected in a daisy chain using the control bus. A first one of the image sensors configured as a master outputs image data to the data bus, outputs a first clock signal to the clock bus, and sends a control signal to a second one of the image sensors in the daisy chain through the control bus. The control signal has a first logic state when output of the first image data starts and a second other logic state when output of the first image data ends. The second image sensor connects itself to the data bus and the master disconnects itself from the data bus according to a state of the first control signal.

21 Claims, 8 Drawing Sheets

(56) References Cited

U.S. PATENT DOCUMENTS

| | | | |
|---|---|---|---|
| 10,841,478 B2* | 11/2020 | Mitsubayashi | H04N 23/66 |
| 11,086,810 B2 | 8/2021 | Li et al. | |
| 2004/0119844 A1* | 6/2004 | Aldrich | H04N 5/772 |
| | | | 386/E5.072 |
| 2005/0077450 A1* | 4/2005 | Baer | H04N 13/296 |
| | | | 348/E13.025 |
| 2011/0242355 A1* | 10/2011 | Goma | H04N 23/45 |
| | | | 348/222.1 |
| 2012/0120256 A1* | 5/2012 | Hwang | H04N 23/45 |
| | | | 348/207.1 |
| 2012/0194712 A1* | 8/2012 | Crook | H04N 13/296 |
| | | | 348/262 |
| 2014/0118257 A1 | 5/2014 | Baldwin | |
| 2015/0237267 A1* | 8/2015 | Han | H04N 23/698 |
| | | | 348/218.1 |
| 2016/0182890 A1 | 6/2016 | Goma et al. | |
| 2019/0068842 A1* | 2/2019 | Sheikh | H04N 23/951 |
| 2019/0116351 A1* | 4/2019 | Hewes | H04N 13/296 |
| 2020/0195589 A1 | 6/2020 | Jain et al. | |
| 2021/0133452 A1* | 5/2021 | Berkovich | G06V 20/20 |
| 2021/0210046 A1 | 7/2021 | Iverson et al. | |

\* cited by examiner

HIGH SPEED INTERFACE FOR MULTI IMAGE SENSOR DEVICE

1. TECHNICAL FIELD

Exemplary embodiments of the present inventive concept relate to a multi-image sensor device, and more particularly to communication between images sensors of the multi-image sensor device and an application processor.

2. DISCUSSION OF RELATED ART

An electronic image sensor detects and conveys information used to generate an image. Examples of electronic image sensors includes a charge-coupled device (CCD) and a complementary metal-oxide-semiconductor (CMOS).

Devices for virtual reality (VR) and augmented reality (AR) may include multiple electronic image sensors and an application processor to process images received from the multiple electronic image sensors. The images often need to be synchronized. Having the electronic image sensors connected to the application processor with different high-speed lines requires a lot of area, uses a lot of power, and can make routing difficult.

A high-speed interface is needed to transfer the images from the electronic image sensors to the application processor. However, present interfaces are sensitive to noise, can be difficult to route to multiple image sensors, and have a difficulty ensuring that the multiple image sensors remain synchronized.

SUMMARY

A multi-image sensor system according to an embodiment of the inventive concept includes a data bus, a clock bus, a control bus, an application processor, and a plurality of image sensors. The application processor is connected to the data bus and the clock bus. The plurality of image sensors is connected together in a daisy chain using the control bus. The image sensors are configured to selectively connect to the data bus and the clock bus. A first one of the image sensors is configured as a master. The master outputs first image data to the data bus, outputs a first clock signal to the clock bus, and sends a first control signal to a second one of the image sensors in the daisy chain through the control bus. The first control signal has a first logic state when output of the first image data starts and a second other logic state when output of the first image data ends.

A multi-image sensor system according to an embodiment of the inventive concept includes a data bus, a clock bus, an application processor, a plurality of image sensors, a control bus, and a synchronization bus. The application processor is connected to the data bus and the clock bus. The plurality of image sensors is configured to selectively connect to the data bus and the clock bus. A first one of the image sensors is configured as a master. The control bus is connected to each of the image sensors. The synchronization bus is connected to each of the image sensors. the master outputs a synchronization signal to each of the other image sensors through the synchronization bus to perform a synchronization. The master outputs first image data to the data bus, outputs a first clock signal to the clock bus, and sends a control signal to each of the other image sensors through the control bus after the synchronization. The control signal has a first logic state when output of the first image data starts and a second other logic state when output of the first image data ends. The second image sensor connects itself to the data bus and the clock bus upon determining that the first control signal has the second logic state. The second image sensor sets the control signal to the first logic state after connecting itself to the data bus and the clock bus. The master disconnects itself from the data bus and the clock bus after determining that the control signal has been set to the first logic state.

A multi-image sensor system according to an embodiment of the inventive concept includes a data bus, a clock bus, an application processor, a plurality of image sensors, and a control bus. The application processor is connected to the data bus and the clock bus. The image sensors are configured to selectively connect to the data bus and the clock bus. A first one of the image sensors is configured as a master. The control bus is connected to each of the image sensors for outputting a control signal. The master transitions the control signal from a first logic state to a second logic state to perform a synchronization of the other image sensors. The master outputs first image data to the data bus and outputs a first clock signal to the clock bus while the control signal has the second logic state and sets the control signal to the first logic state after completing output of the first image data. The second image sensor connects itself to the data bus and the clock bus when a count of pulses of the control signal has a value indicating a turn of the second image sensor. The master disconnects itself from the data bus and the clock bus a first period of time after setting the control signal to the first logic state.

BRIEF DESCRIPTION OF THE DRAWINGS

The present inventive concept will become more apparent by describing in detail exemplary embodiments thereof with reference to the attached drawings, in which.

DETAILED DESCRIPTION

Figure 1:
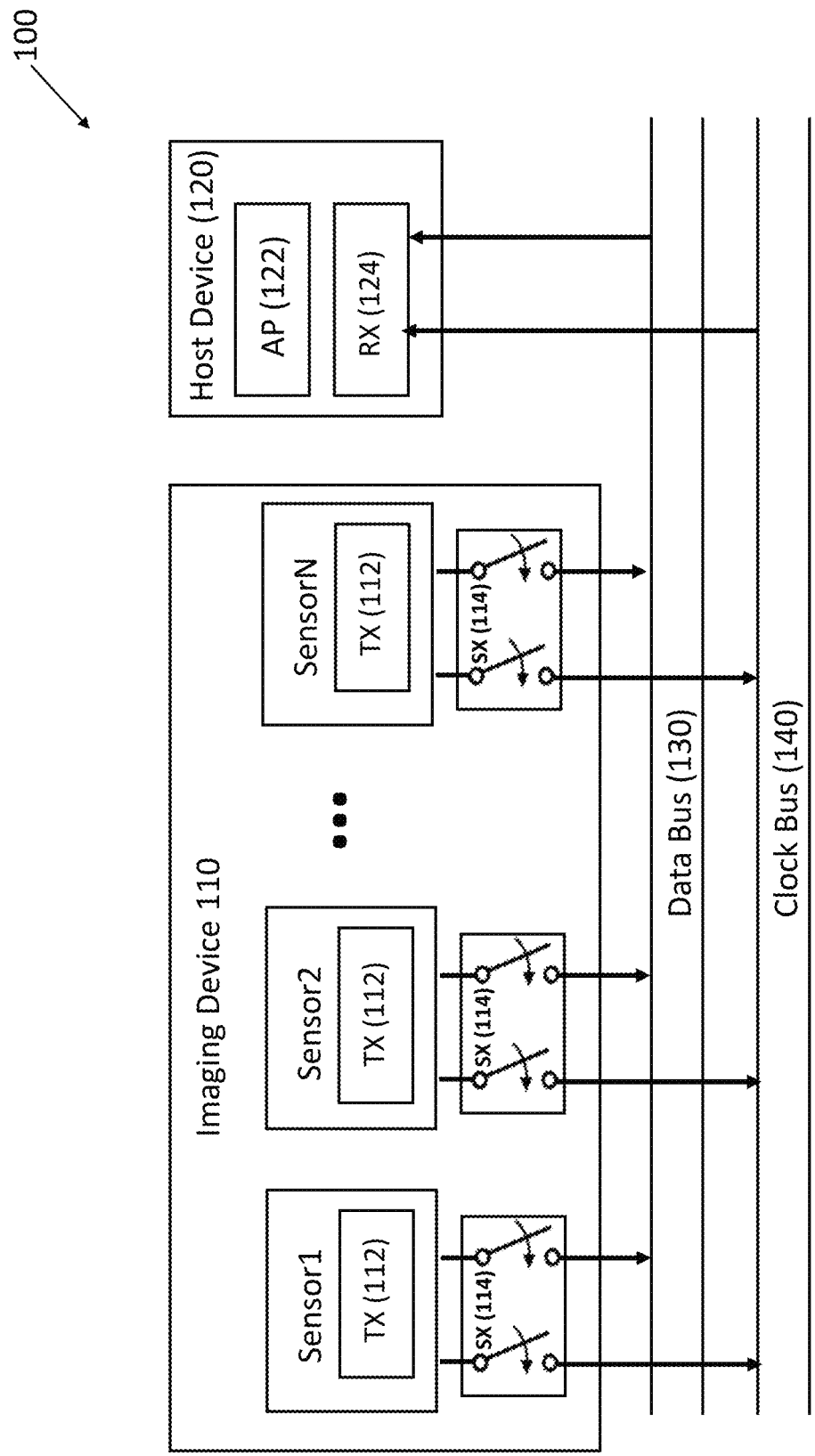
FIG. 1 is a block diagram illustrating a multi-image sensor system in accordance with an exemplary embodiment of the present inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

FIG. 1 is a block diagram illustrating a multi-image sensor system in accordance with an exemplary embodiment of the inventive concept.

Referring to FIG. 1, the multi-image sensor system 100 includes an imaging device 110, a host device 120, a data bus 130, and a clock bus 140. The host device 120 includes an application processor 122 and a receiver 124 connected to the data bus 130 and the clock bus 140. In an embodiment, the host device 120 may be replaced with only the application processor 122. The host device 120 may additionally include an interface for communicating directly with the imaging device 110 and one or more additional lines may be present connecting the imaging device 110 to the host device 120 to sending and receiving interrupts. The system 100 may further include a memory device accessible to the imaging device 110 and/or the host device 120 that stores one or more configuration parameters.

The imaging device 110 includes a plurality of image sensors Sensor1, Sensor2, . . . , SensorN. Each image sensor is configured to selectively connect to the data bus 130 and the clock bus 140. In an embodiment, each image sensor includes a switching circuit 114 for connecting to the data bus 130 and the clock bus 140. For example, each switching circuit 114 may include a first switch for connecting to the data bus 130 and a second switch for connecting to the clock bus 140. The switching circuits 114, the data bus 130, and the clock bus 140 may form a high-speed interface. In an embodiment, each of the image sensors references a corresponding one of the configuration parameters to determine its order to begin acting (e.g., sending image data on the bus, taking control of the bus, etc.) or timing to begin acting.

Each image sensor may include a transmitter 112 for communicating with one or more of the other image sensors. Image data may be sent from the imaging device 110 to the application processor 122 through the data bus 130. A clock signal (e.g., a square wave or signal oscillating between low and high states) may be sent from a given one of the image sensors to the application processor 122 at a certain operating frequency so that the application processor 122 knows how to process the corresponding image data since each image sensor may have a different operating frequency. In an embodiment, each image sensor includes its own internal clock generator to generate its clock signal. In another embodiment, a single clock generator is provided to provide an external source clock signal, the clock signals of the image sensors that may be different from one another are derived from the external source clock signal. The host device 120 may include a receiver 124 for receiving the image data from the data bus 130 and the clock signal from the clock bus 140.

The multi-image sensor system 100 may use a Mobile Industry Processor Interface (MIPI) standard for transferring images from a given one of the image sensors to the application processor 122. Some applications require several of the image sensors to send images to the same application processor (e.g., 120) at the same or substantially the same time, and for the images to be synchronized. For example, in AR, some of the image sensors may be used to capture the user environment for determining location and depth information.

Figure 2:
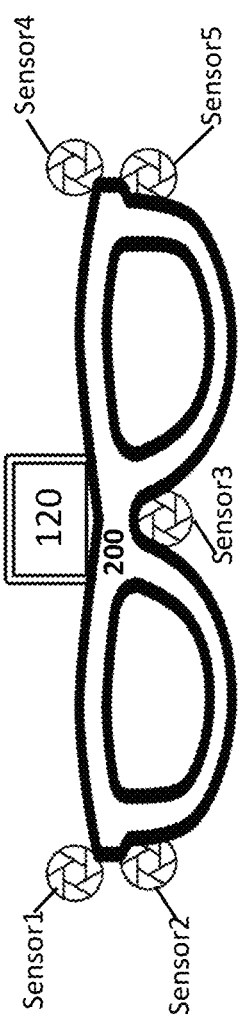
FIG. 2 illustrates the multi-image sensor system being applied to glasses according to an exemplary embodiment of the inventive concept.

FIG. 2 is an example of the multi-image sensor system being implemented as glasses that may be used for virtual reality or augmented reality. The multi-image sensor system 100 includes the host device 120 and the sensors of the imaging device 110. While FIG. 2 illustrates five sensors Sensor1, Sensor2, Sensor3, Sensor4, and Sensor5 having different locations on glasses 200, embodiments of the inventive concept are not limited to any particular number of sensors or these locations. Wires may be routed through a body of the glasses 200 to connect a given one of the sensors Sensor1-Sensor5 to another one of the sensors or to the host device 120. The data bus 130 and the clock bus 140 may include one or more of these wires. The system of FIG. 2 requires a high-speed interface. However, the lines of such an interface are sensitive to loading and to capacity. Further, the image sensors may use different clock signals, which might cause them to drift from each other.

In an embodiment, one of the image sensors is a master sensor and the other image sensors are subordinate sensors. The image data that is sent from the master to the application processor 122 can be ordered using a frame-by-frame method or by using a block-by-block method.

In the frame-by-frame method, each image sensor sends a whole frame of image data to the application processor 122 through the data bus 130 and then passes control of the data bus 130 and the clock bus 140 to a next (e.g., right) one of the image sensors. The image sensors will send the image data to the application processor 122 in cyclic order frame by frame. In the frame-by-frame method, the frame sizes of the image sensors do not need to be the same size for all sensors.

In the block-by-block method, each image sensor may send a block of a pre-defined block size of its image data to the application processor 122 and then pass control of the data bus 130 and the clock bus 140 to a next (e.g., right) one of the image sensors. The image sensors will send image data cyclically until the end of the frame. In the block-by-block method, not all the image sensors have to send the image data in every cycle in the frame.

In an embodiment, the frame-by-frame method is used by global shutter image sensors and the block-by-block method is used by rolling shutter image sensors. However, the inventive concept is not limited thereto. For example, the frame-by-frame could be used when the image sensors are global shutter image sensors, and the block-by-block method could be used when the image sensors are rolling shutter image sensors.

Figure 3A:
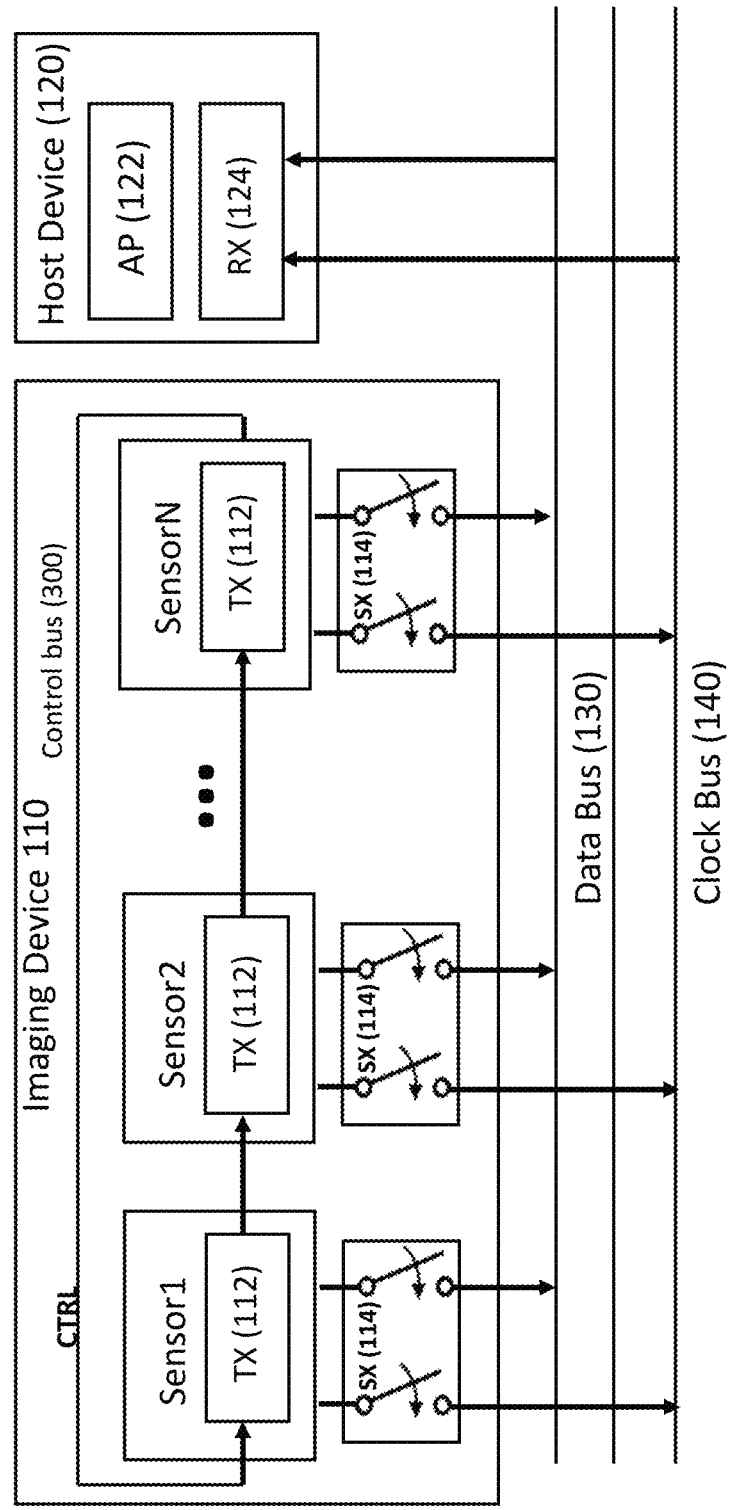
FIG. 3A illustrates communication within the multi-image sensor system according to an embodiment of the inventive concept.
Figure 3B:
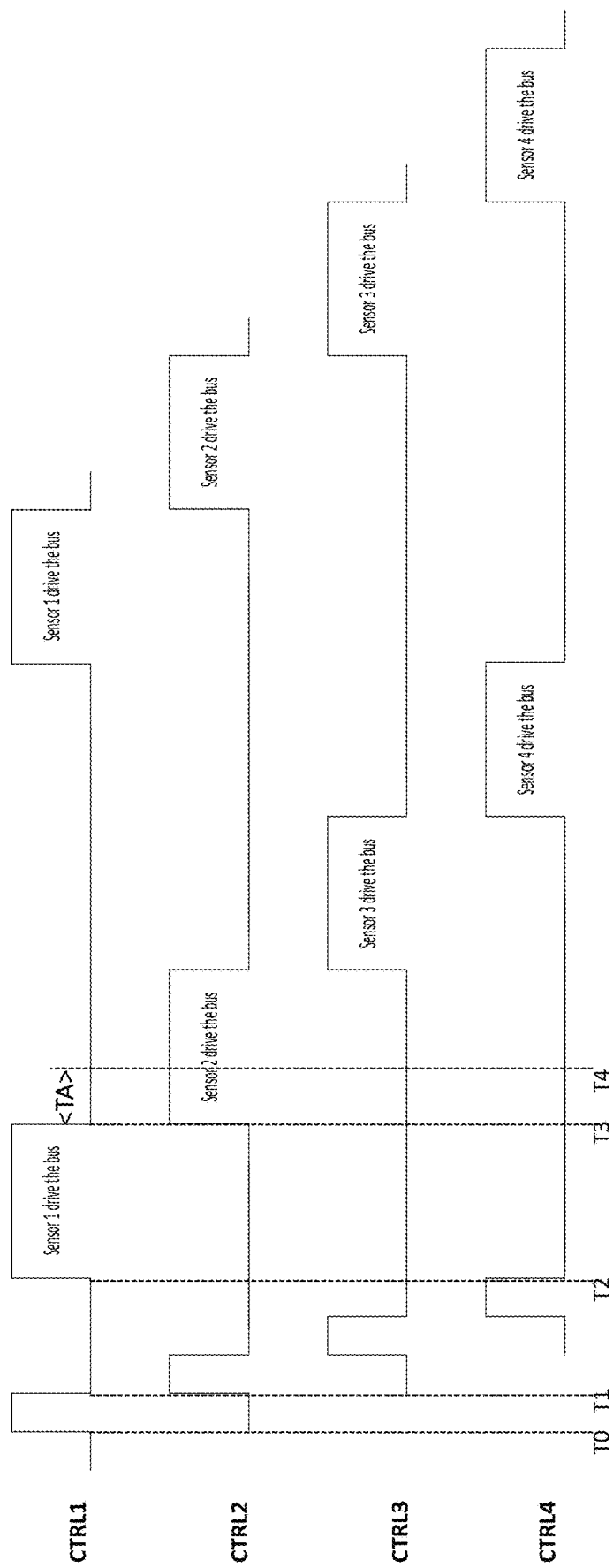
FIG. 3B illustrates examples of control signals that may be used in the communication of FIG. 3A.

FIG. 3A illustrates an embodiment of the multi-image sensor system of FIG. 1 where the image sensors are connected in a daisy chain arrangement using a Control bus 300 for communicating with one another using a control signal CTRL. For example, the control bus 300 includes a first line connecting a transmitter 112 of the first image sensor Sensor1 to the second image sensor Sensor2 for providing a first control signal CTRL1 to the second image sensor Sensor2, a second line connecting a transmitter 112 of the second image sensor Sensor2 to an N-th image sensor SensorN (e.g., a last image sensor) for providing a second control signal CTRL2 to the N-th image sensor SensorN, and an N-th line connecting a transmitter 112 of the N-th sensor SensorN to the first image sensor Sensor1 for providing an N-th control signal to the first image sensor Sensor1. FIG. 3B illustrates an example of the communicating when there are four image sensors. The control signal CTRL is illustrated in FIG. 3B as CTRL1, CTL2, CTRL3, and CTRL4 to correspond to the control signals output by the first, second, third, and fourth image sensors, respectively when N is 4.

Referring to FIG. 3A and FIG. 3B, each image sensor sends to a next image sensor information in the control signal CTRL about the time for the next image sensor to start sending its image data. One of the image sensors is defined as the master sensor and the other image sensors are subordinate to the master sensor (e.g., subordinate sensors). For example, the first image sensor Sensor1 could be defined as the master and image sensors Sensor2, . . . , SensorN could be subordinate. The master sensor may stop sending its image data at the end of the frame and initiate the sending of its image data at the beginning of the next frame.

The first image sensor Sensor1 sends a first synchronization indication in the control signal CTRL1 to the second image sensor Sensor2. In FIG. 3B, the synchronization indication is a signal set to a first logic state (e.g., a high) between time T0 and time T1 and set to a second other logic state (e.g., a low) after T1. In response to receiving the first synchronization indication, the second image sensor Sensor2 sends a second synchronization indication in the control signal CTRL2 to the third image sensor. In response to receiving the second synchronization indication, the third image sensor sends a third synchronization indication in the control signal CTRL3 to the third image sensor. In response to receiving the third synchronization indication, the fourth image sensor sends a fourth synchronization indication in the control signal CTRL4 to the first image sensor Sensor1. In an embodiment, none or only one of the image sensors are connected to the data bus 130 and the clock bus 140 during the synchronization. The synchronization indication may be used to sync the exposure schedule of the image sensors. In an embodiment, the exposure is the time that an image sensor receives light and captures an image. In an embodiment, each image sensor includes a shutter that can be opened (i.e., exposed) to allow for capturing of an image or closed to prevent the capturing of an image. However, the inventive concept is not limited thereto as an image sensor need not include a shutter. The exposure schedule may indicate times when the shutter of each of the image sensors is opened and closed.

After the synchronization completes (in response to receiving a synchronization indication from the last image sensor), at time T2 the first image sensor Sensor1 (i.e., the master) sets the first control signal CTRL1 to the first logic state (e.g., high), takes control of the data bus 130 and the clock bus 140 and begins outputting image data to the data bus 130 and a clock signal to the clock bus 140. Taking control of the data bus 130 and the clock bus 140 may include the image sensor connecting itself to the data bus 130 and the clock bus 140 using the switching circuit 114. The first image sensor Sensor1 continues to output the image data and at time T3 the first image sensor Sensor1 stops outputting the image data and the clock signal, sets the first control signal CTRL1 to the second logic state (e.g., a low), and remains connected to the data bus 130 and the clock bus 140. The first image sensor Sensor1 waits for a period of time TA (e.g., 1 microsecond, 2 microseconds, etc.) after time T3 until time T4. After time T4, the first image sensor Sensor1 disconnects itself from the data bus 130 and the clock bus 140. For example, the switches of the switching circuit 114 of the first image sensor Sensor1 are closed from times T2 until time T4 and then opened after time T4. When the second image sensor Sensor2 notices that the received first control signal CTRL1 has the logic state (e.g., low) at time T3, the second image sensor Sensor2 outputs a second control signal CTRL2 set to the first logic state (e.g., high) to the third image sensor, the second image sensor Sensor2 connects itself to the data bus 130 and the clock bus 140, and begins outputting its image data to the data bus 130 and its clock signal to the clock bus 140 at time t4. The second image sensor Sensor2 may wait a period of time (e.g., 1 microsecond, 2 microseconds, etc.) upon noticing that the received first control signal CTRL1 has the logic state before it outputs its image data and its clock signal at time T4. The first image sensor Sensor1 remains connected to the data bus 130 and the clock bus 140 for a small initial part TA of the period during which the second image sensor Sensor2 is also connected to the data bus 130 and the clock bus 140 (e.g., from T3 to T4). The period TA is designed to be short enough to prevent a short circuit or to damage to the connected sensors. The process repeats for each next one of the sensors until all image data has been sent to the application processor 122. If a current image sensor has image data ready to be sent but the previous image sensor is outputting its image data to the data bus 130, the current image sensor may halt and issue an error interrupt. For example, if the second image sensor Sensor2 is about to output image data at time T4 to the data bus 130, but then it determines that the first image sensor Sensor1 is still outputting image data on the data bus 130, the second sensor Sensor2 may send the error interrupt to the first image sensor Sensor1, the application processor 122, or another one of the image sensors (e.g., SensorN). An interrupt line may be present between a pair of the image sensors that enables an image sensor to send an interrupt to another image sensor. An interrupt line may be present between an image sensor and the host device 120 or the application processor 122 that enables the image sensor to send the error interrupt to the host device 120 or the application processor 122. The host device 120 or the application process 122 may forward the received error interrupt to all the image sensors through a corresponding interrupt line to inform them of the error so they can halt operations.

The handshake between two image sensors is quick. The image sensor that is sending the image data is controlling the data bus 130 and the clock bus 140. When the image sensor finishes sending its image data, it de-asserts a control signal it sends to a next image sensor so the next image sensor knows it should take ownership of the data bus 130 and the clock bus 140. The next image sensor may wait some time before sending its image data and clock signal to make sure the prior image sensor is done using the bus. For example, instead of outputting its image data and clock signal at time T3, the second sensor Sensor2 may begin outputting its image data and clock signal at a time between T3 and T4 or at time T4. The communication method described above with respect to FIG. 3A and FIG. 3B may be more efficient when used with a block-by-block method as opposed to being used with a frame-by-frame method.

Figure 4A:
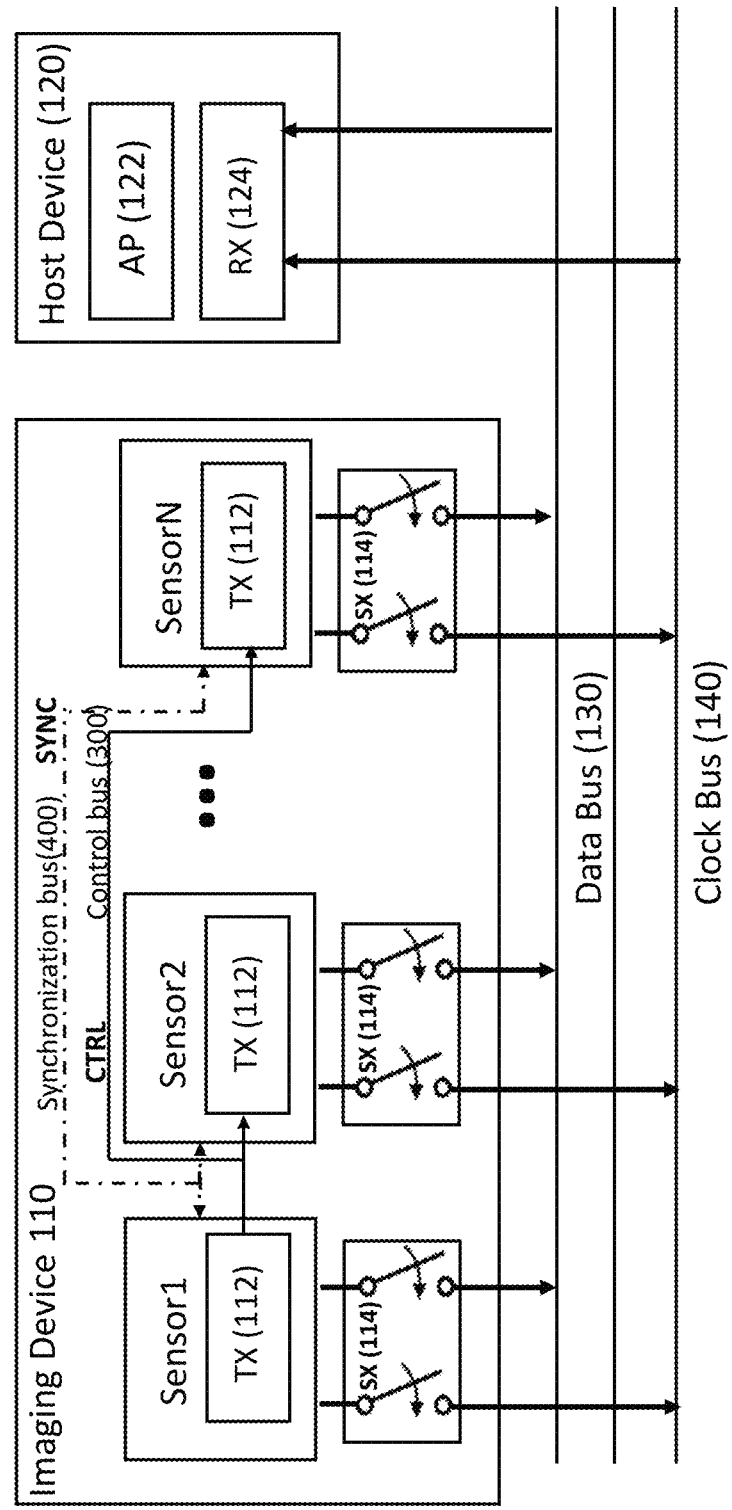
FIG. 4A illustrates communication within the multi-image sensor system according to an embodiment of the inventive concept.
Figure 4B:
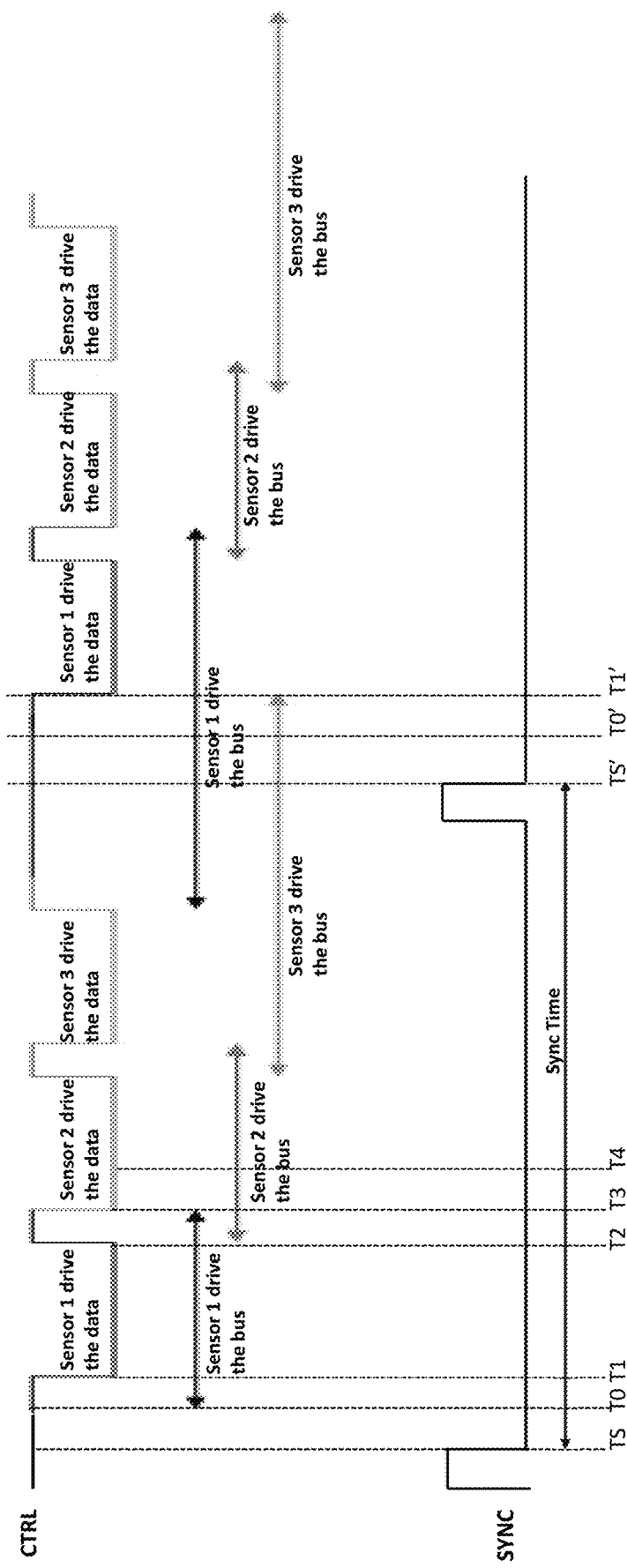
FIG. 4B illustrates examples of control and synchronization signals that may be used in the communication of FIG. 4A.

FIG. 4A illustrates an embodiment of the multi-image sensor system of FIG. 1 where the image sensors communicate with one another using a Control bus 300 and a Synchronization bus 400. FIG. 4B illustrates an example where three image sensors communicate using the Control bus 300 and the Synchronization bus 400.

The Control bus 300 includes one or more first lines or wires connecting the first image sensor Sensor1 to each of the other sensors (e.g., Sensor2, . . . , SensorN). Thus, the Control bus 300 connects the first sensor Sensor1 to all the available image sensors. The Control bus 300 is used by the image sensors for sending a control signal CTRL.

The Synchronization bus 400 includes one or more second lines or wires connecting the first image sensor Sensor1 to each of the other sensors (e.g., Sensor2, . . . . SensorN). The Synchronization bus 400 may be a line distinct and separate from the Control bus 300. Thus, the Synchronization bus 400 connects the first image sensor Sensor1 to all the available image sensors. The Synchronization bus 400 is used by the image sensors for sending a synchronization signal SYNC. The synchronization signal SYNC may include sync pulses occurring each Sync Time (e.g., from TS to TS').

The embodiment of FIGS. 4A and 4B may be referred to as two-wire control since two different buses are used. The Synchronization bus 400 is used for sending the synchronization signal SYNC from a master sensor (e.g., Sensor1) to all the other image sensors and to allow the other image sensors (e.g., Sensor2, . . . , SensorN) to sync using the synchronization signal SYNC. The Control bus 300 is used to send the control signal CTRL, which is shared by all image sensors. Each image sensor checks the control signal CTRL before sending its image data on the data bus 130. If the control signal CTRL is not active, the image sensor will activate the control signal CTRL and start sending its image data. Each control signal CTRL sent to a next image sensor in the chain includes information about the time for the next image sensor to start sending its image data. One image sensor is defined as the master, and this master stops sending data at the end of the frame and initiates the sending of the image data at the beginning of the next frame. In this method, the master (e.g., Sensor1) synchronizes the system 100 by sending the synchronization signal SYNC on the Synchronization bus 400 to all the other image sensors. In an embodiment, only the master is allowed to send the synchronization signal SYNC on the Synchronization bus 400. The Synchronization signal will sync both the exposure and the time to send image data on the data bus 130. For example, at time TS, each of the image sensors Sensor2, . . . , SensorN observe a sync pulse on the Synchronization bus 400 at the start of a frame, which they use to synchronize themselves with. The sync pulse may be sent by the master at the start each next frame.

The Control signal CTRL may be an open drain signal that each of the image sensors can pull to the second logic state (e.g., low) when ready to send image data. When an image sensor wants to send image data, it will check if the control signal CTRL is a first logic state (e.g., high) and if it is, the image sensor will pull the control signal CTRL to a second logic state (e.g., low) and start a handshaking process to send its image data. If the control signal CTRL is already a second logic state (e.g., low), it means a different image sensor is already sending its image data and the image sensor will cancel its actions and may set or send an error interrupt.

The image sensor that is sending its image data is controlling the data bus 130 and the clock bus 140. For example, the image sensor that is sending, is connected to the data bus 130 and the clock bus 140. When the image sensor finishes sending its image data, it will de-assert the control signal CTRL or bring it to a first logic state (e.g., a high). The image sensor continues to control the data bus 130 and the clock bus 140 (e.g., remains connected to the bus) until the next image sensor starts the handshake. When the next image sensor asserts the control signal CTRL or brings it to a second logic state (e.g., a low), the prior image sensor waits for a pre-defined period of time to allow the next image sensor to take control of the data bus 130 and the clock bus 140 and then releases control of the bus (e.g., disconnects itself from the data bus 130 and the clock bus 140). The next image sensor may wait enough time to allow the previous image sensor to release control of the data bus 130 and the clock bus 140.

Referring to FIG. 4B, the first image sensor Sensor1 sends out a sync signal SYNC to all of the other image sensors through the Synchronization bus 400 to synchronize the image sensors. After the synchronization completes, the first image sensor Sensor1 begins driving the data bus 130 and the clock bus 140 (e.g., connects itself to the bus) at time T0, and sets the control signal CTRL to a second logic state (e.g., a low) and begins outputting image data and a clock signal to the application processor 122 at time T1. When the first image sensor Sensor1 finishes outputting its image data, it sets the control signal CTRL to a first logic state (e.g., a high) at time T2 and remains connected to the data bus 130 and the clock bus 140. In response to receiving the synchronization signal SYNC from the first image sensor Sensor1 and waiting a first period of time (e.g., from TS to T3), the second image sensor Sensor2 connects itself to the data bus 130 and the clock bus 140, sets the control signal CTRL to the second logic state (e.g., a low), and waits a second amount of time until from time T3 to time T4. For example, the time from T3 to T4 could be 1 microsecond, 2 microseconds, etc., but is not limited thereto. For example, in FIG. 4B, the second image sensor Sensor2 waits until time T3 before setting the control signal CTRL to the second logic state (e.g., low). After the first image sensor Sensor1 (i.e., the master) sets the control signal CTRL to the first logic state (e.g., high) at time T2, the master periodically checks the control signal CTRL to determine whether it has been set to the second logic state (e.g., low) by another one of the image sensors. If the master determines that the control signal CTRL is now set to the second logic state, the master stops driving the data bus 130 and the clock bus 140. For example, the master might notice that the second image sensor Sensor2 has set the control signal CTRL to the second logic state (e.g., low) after time T3 or between time T3 and time T4, and then disconnects itself from the data bus 130 and the clock bus 140. After the second amount of time at time T4, the second image sensor Sensor2 begins outputting its image data through the data bus 130 and its clock signal through the clock bus 140 to the application processor 122. The above process repeats for each of the other image sensors. The master may then send another sync pulse at time TS' on the Synchronization bus 400 so that the process may start again with respect to the first image sensor at time TS0'.

The two-wire control is very flexible since each image sensor except for the master sensor, can be turned on and off without updating the other image sensors in the system.

Figure 5A:
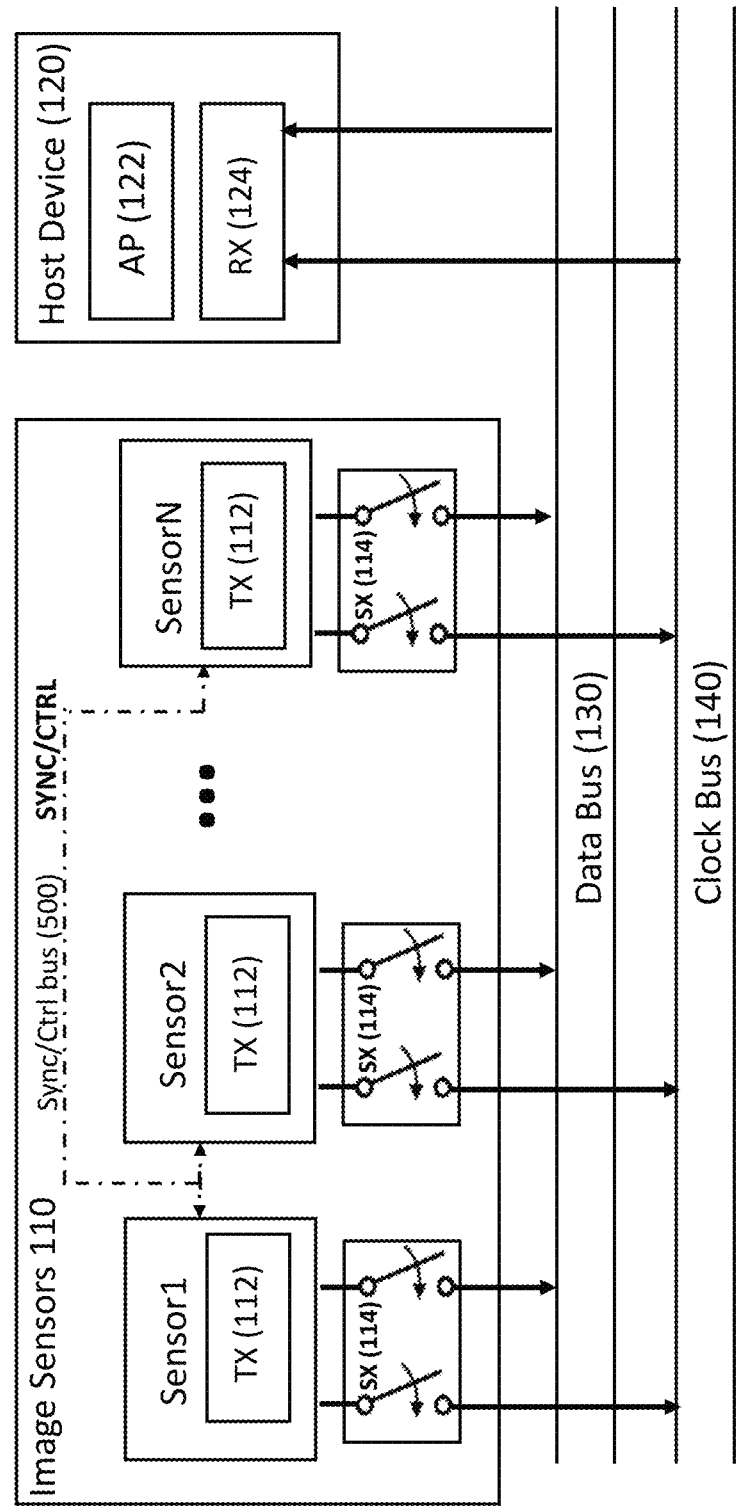
FIG. 5A illustrates communication within the multi-image sensor system according to an embodiment of the inventive concept.
Figure 5B:
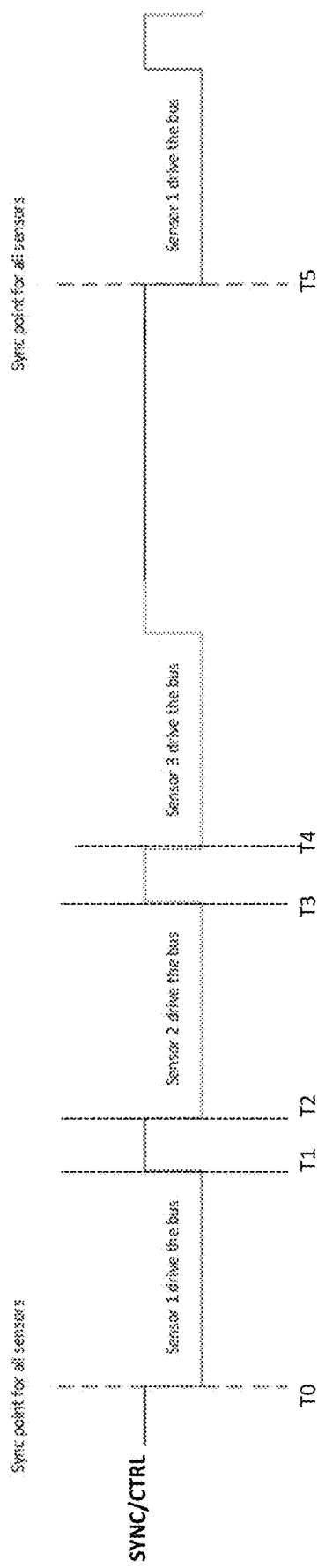
FIG. 5B illustrates examples of control and synchronization signals that may be used in the communication of FIG. 5A.

FIG. 5A illustrates an embodiment of the multi-image sensor system of FIG. 1 where the image sensors communicate with one another using a single synchronization/control (sync/ctrl) bus 500. FIG. 5B illustrates an example where three image sensors communicate using the sync/ctrl bus 500.

The sync/ctrl bus 500 includes one or more lines or wires connecting the first image sensor Sensor1 (e.g., a master sensor) to each of the other sensors (e.g., Sensor2, . . . , SensorN). Thus, the sync/ctrl bus 500 connects the first sensor Sensor1 to all the available image sensors. The sync/ctrl bus 500 is used by the image sensors for sending a SYNC/CTRL signal.

The embodiment of FIGS. 5A and 5B may be referred to as one-wire control since a single bus (i.e., the sync/ctrl bus 500) or wire is used that is shared by all the sensors. All of the image sensors synchronize to the start of the image data of the master sensor. The sync/ctrl bus 500 may be used for synchronization of the image sensors and for collusion protection. Collusion protection involves preventing two or more image sensors from outputting their image data on the bus at the same time. In this embodiment, there is one signal (e.g., SYNC/CTRL) that used for both synchronization and for determining when it is time for a given image sensor to determine whether it should output image data to the application processor 122. The SYNC/CTRL signal can be asserted by all the image sensors in the system. Each image sensor in the system may be aware of its number or order within the system or a number of counted pulses for determining whether it is its turn to begin its attempt to take control of the bus. Each of the subordinate image sensors counts the number of pulses in the SYNC/CTRL signal and syncs to a falling edge of SYNC/CTRL signal set by the master. For example, since there are three image sensors, FIG. 5B shows that each of the image sensors may be synced in response to the first falling edge at T0, the fourth falling edge at T4, etc. The synchronization is both for the exposure and for the timing. Each image sensor may initiate output of its image data after a pre-defined time from the sync transaction (i.e., the falling edge). When an image sensor wants to send image data, the image sensor waits a number of pulses until it is its turn according to its location within the chain and checks if the SYNC/CTRL signal is a first logic state (e.g., high). If the SYNC/CTRL signal is the first logic state (e.g., high), the image sensor sets the SYNC/CTRL signal to a second logic state (e.g., low) and starts a handshake to send its image data. If the image sensor determines the SYNC/CTRL signal is already the second logic state (e.g., low) during the check, it means another one of the image sensors is currently sending image data and the sensor will cancel the action and may set or send an error interrupt.

The handshake in one-wire control is the same as in two-wire control. The image sensor that is sending the image data is controlling the data bus 130 and the clock bus 140. When the current image sensor finishes sending its image data, the current sensor de-asserts the SYNC/CTRL signal or sets the SYNC/CTRL signal to a first logic state (e.g., high) and the current image sensor continues to control the data bus 130 and the clock bus 140 until the next image sensor starts the handshake. When the next image sensor asserts the SYNC/CTRL signal or sets the SYNC/CTRL signal to the second logic state (e.g., low), the prior image sensor waits for a pre-defined time to allow the next image sensor to take control of the data bus 130 and the clock bus 140, and then releases control of the data bus 130 and the clock bus 140 (e.g., disconnects itself from the data bus 130 and the clock bus 140). The next image sensor may wait enough time to allow the previous image sensor to release control of the data bus 130 and the clock bus 140.

Referring to FIG. 5B, the first image sensor Sensor1 transitions the SYNC/CTRL signal from a first logic state (e.g., high) to a second logic state (e.g., low) at time T0. The other image sensors Sensor2, . . . . SensorN may sync themselves using the falling edge of the SYNC/CTRL that occurs at time T0. The first image sensor Sensor1 takes control of the data bus 130 and the clock bus 140 at time T0 and then begins outputting its image data to the data bus 130 and its clock signal to the clock bus 140. When the first image sensor Sensor1 finishes its outputting, the first image sensor Sensor1 sets the SYNC/CTRL signal to a first logic state (e.g., a high) at T1 and then periodically performs a check to determine whether a next image sensor has set the SYNC/CTRL signal to the second logic state (e.g., low). Since the second image sensor Sensor2 acts second, the second image sensor begins its handshake at time T1 after counting that one pulse has occurred at time T1. In the handshake, the sensor image sensor Sensor2 sets the SYNC/CTRL signal to the second logic state (e.g., low) at time T2. When the first image sensor Sensor1 determines in one of its checks that the SYNC/CTRL signal has become set to the second logic state (e.g., low), the first image sensor Sensor1 waits a first period of time (e.g., 1 microsecond) and then releases control of the data bus 130 and the clock bus 140. After the second image sensor Sensor2 sets the SYNC/CTRL signal to the second logic state (e.g., low) at time T2, the second image sensor Sensor2 waits a second period of time (e.g., 2 microseconds), and after the second period of time, the second image sensor Sensor2 takes control of the data bus 130 and the clock bus 140 and begins outputting image data to the data bus 130 and its clock signal to the clock bus 140. In an embodiment, the second period is larger than the first period of time. While the above provides an example of the first period being 1 microsecond and the second period being 2 microseconds, the inventive concept is not limited thereto. After completing its output, the second image sensor Sensor1 sets the SYNC/CTRL signal to a first logic state (e.g., a high) at T3 and then periodically performs a check to determine whether a next image sensor has set the SYNC/CTRL signal to the second logic state (e.g., low).

Since the third image sensor acts third, the third image sensor begins its handshake at time T3 after counting that a second pulse has occurred at time T3. In the handshake, the third image sensor sets the SYNC/CTRL signal to the second logic state (e.g., low) at time T4. When the second image sensor Sensor2 determines in one of its checks that the SYNC/CTRL signal has become set to the second logic state (e.g., low) after T4, the third image sensor waits a first period of time (e.g., 1 microsecond) and then releases control of the data bus 130 and the clock bus 140. After the second image sensor Sensor2 sets the SYNC/CTRL signal to the second logic state at time T4, the third image sensor waits a second period of time, and after the second period of time, the third image sensor takes control of the data bus 130 and the clock bus 140 and begins outputting image data to the data bus 130 and its clock signal to the clock bus 140. The process repeats for all the other image sensors.

The one wire-control method may allow for optimal routing since there is only one SYNC/CTRL bus.

Synchronization may need to be performed for all the sensors to send the image data to the application processor 122 at different times on the bus, but at the same time can be used to synchronize the sensors to start the exposure at the same time. In the two-wire and the one-wire methods, all the sensors can be synchronized to the master. As a result, the jitter between any two sensors in the system is double the jitter of the synchronization from the master. In the daisy chain arrangement, each sensor is synchronized to the sensor before it. As a result, the synchronization jitter is N*jitter from the first to the last sensor in the chain N is the number of the sensor in the chain. This can be avoided if the first pulse on the daisy chain has a short sync pulse that will pass as is between all sensors. Accordingly, the jitter may be reduced between all sensors in the system to be double the jitter of synchronization from the master.

Damage may occur when more that one image sensor sends its image data on the bus at the same time. Since each one of the image sensors is checking for an indication to see if it can send its image data on the bus, and an image sensor issues an interrupt if the bus is occupied by a different image sensor instead of sending its image data, damage to the system may be prevented.

A multi-image sensor system may use a Global Shutter (GS) or a Rolling Shutter (RS). Since the GS has a frame buffer, it allows for sampling of the image at the same time in all the image sensors and sending of image data at different times. The RS does not have frame buffer and therefore cannot hold more than a few lines of the frame. This requires the RS to interleave data on the lines. Due to the frequent changes, the daisy chain architecture may be more suitable for use with the RS.

Although the present inventive concept has been described in connection with exemplary embodiments thereof, those skilled in the art will appreciate that various modifications can be made to these embodiments without substantially departing from the principles of the present inventive concept.

What is claimed is:

1. A multi-image sensor system comprising:
    a data bus;
    a clock bus;
    a control bus;
    an application processor connected to the data bus and the clock bus;
    a plurality of image sensors connected together in a daisy chain using the control bus, the image sensors configured to selectively connect to the data bus and the clock bus and a first image sensor among the image sensors is configured as a master,
    wherein the master outputs first image data to the data bus, outputs a first clock signal to the clock bus, and sends a first control signal to a second image sensor among the image sensors in the daisy chain through the control bus,
    wherein the first control signal has a first logic state when output of the first image data starts and a second other logic state when output of the first image data ends,
    wherein the second image sensor connects itself to the data bus and the clock bus upon determining that the first control signal has the second logic state, and
    wherein the master disconnects itself from the data bus and the clock bus a period of time after setting the first control signal to the second logic state.

2. The multi-image sensor system of claim 1, wherein the second image sensor outputs second image data to the data bus, outputs a second clock signal to the clock bus, and sends a second control signal to a third one of the image sensors in the daisy chain through the control bus after connecting itself to the data bus and the clock bus, wherein the second control signal has the first logic state when output of the second image data starts and the second logic state when output of the second image data ends.

3. The multi-image sensor system of claim 1, wherein the first control signal includes a synchronization pulse before being set to the first logic state, and the second image sensor is synchronized in response to the synchronization pulse.

4. The multi-image sensor system of claim 2, wherein the application processor receives the first image data and the second image data from the data bus, receives the first clock signal and the second clock signal from the clock bus, processes the first image data using the first clock signal and the second image data using the second clock signal.

5. The multi-image sensor system of claim 1, further comprising a hardware interface that enables each of the image sensors to selectively connect to the data bus and the clock bus.

6. The multi-image sensor system of claim 1, wherein the second image sensor sends an error interrupt to the application processor upon determining that the first control signal has the second logic state but the master is still outputting image data to the data bus.

7. The multi-image sensor system of claim 1, wherein each image sensor sends a block of its image data less than an entire frame to the application processor and then passes control of the data bus and the clock bus to a next one of the image sensors in the daisy chain.

8. The multi-image sensor system of claim 1, further comprising glasses, and the image sensors are mounted to the glasses.

9. A multi-image sensor system comprising:
    a data bus;
    a clock bus;
    an application processor connected to the data bus and the clock bus;
    a plurality of image sensors configured to selectively connect to the data bus and the clock bus and a first image sensor among the image sensors is configured as a master;
    a control bus connected to each of the image sensors for outputting a control signal; and
    wherein the master transitions the control signal from a first logic state to a second logic state to perform a synchronization of the other image sensors,
    wherein the master outputs first image data to the data bus and outputs a first clock signal to the clock bus while the control signal has the second logic state and sets the control signal to the first logic state after completing output of the first image data,
    wherein a second image sensor among the image sensors connects itself to the data bus and the clock bus when a count of pulses of the control signal has a value indicating a turn of the second image sensor,
    wherein the master disconnects itself from the data bus and the clock bus a first period of time after setting the control signal to the first logic state.

10. The multi-image sensor system of claim 9, wherein the second image sensor outputs second image to the data bus and a second clock signal to the clock bus a second period of time after connecting itself to the data bus and the clock bus.

11. The multi-image sensor system of claim 10, wherein the second period is larger than the first period.

12. The multi-image sensor system of claim 9, wherein each of the image sensors stores information indicating its order for outputting and the value is determined from the information.

13. The multi-image sensor system of claim 9, wherein the second image sensor sends an error interrupt to the application processor when a second period of time elapses after connecting itself to the data bus and the clock bus and the master is still outputting image data to the data bus.

14. The multi-image sensor system of claim 9, further comprising a hardware interface that enables each of the image sensors to selectively connect to the data bus and the clock bus.

15. A multi-image sensor system comprising:
    a data bus;
    a clock bus;
    an application processor connected to the data bus and the clock bus;

a plurality of image sensors configured to selectively connect to the data bus and the clock bus and a first image sensor among the image sensors is configured as a master;
a control bus connected to each of the image sensors; and
a synchronization bus connected to each of the image sensors,
wherein the master outputs a synchronization signal to each of the other image sensors through the synchronization bus to perform a synchronization,
wherein the master outputs first image data to the data bus, outputs a first clock signal to the clock bus, and sends a control signal to each of the other image sensors through the control bus after the synchronization,
wherein the control signal has a first logic state when output of the first image data starts and a second other logic state when output of the first image data ends,
wherein a second image sensor among the image sensors connects itself to the data bus and the clock bus upon determining that the first control signal has the second logic state,
wherein the second image sensor sets the control signal to the first logic state after connecting itself to the data bus and the clock bus, and wherein the master disconnects itself from the data bus and the clock bus after determining that the control signal has been set to the first logic state.

16. The multi-image sensor system of claim 15, wherein the second image sensor outputs second image data to the data bus and outputs a second clock signal to the clock bus a period of time after setting the control signal to the first logic state.

17. The multi-image sensor system of claim 16, wherein the second image sensor sets the control signal to the second logic state after completing its output of the second image data.

18. The multi-image sensor system of claim 17, wherein the second image sensor disconnects itself from the data bus and the clock bus after determining that the control signal has been set to the first logic state after it has set the control signal to the second logic state.

19. The multi-image sensor system of claim 15, wherein the synchronization signal includes a sync pulse at a start of each frame.

20. The multi-image sensor system of claim 15, further comprising a hardware interface that enables each of the image sensors to selectively connect to the data bus and the clock bus.

21. The claim multi-image sensor system of claim 15, wherein the second image sensor sends an error interrupt to the application processor a period of time after setting the control signal to the first logic state but the master is still outputting image data to the data bus.

* * * * *